(12) United States Patent
Biehler

(10) Patent No.: US 9,235,207 B2
(45) Date of Patent: Jan. 12, 2016

(54) METHOD FOR AUTOMATICALLY GENERATING DYNAMIC FRAME PACKING GROUPS

(75) Inventor: Georg Biehler, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 1025 days.

(21) Appl. No.: 13/325,643

(22) Filed: Dec. 14, 2011

(65) Prior Publication Data

US 2012/0151878 A1 Jun. 21, 2012

(30) Foreign Application Priority Data

Dec. 15, 2010 (EP) .................................. 10195136

(51) Int. Cl.
*G05B 19/418* (2006.01)
*H04L 12/40* (2006.01)
*H04L 12/403* (2006.01)
*H04L 12/24* (2006.01)
*H04J 3/24* (2006.01)

(52) U.S. Cl.
CPC ...... *G05B 19/4186* (2013.01); *H04L 12/40006* (2013.01); *H04L 41/085* (2013.01); *H04J 3/24* (2013.01); *H04L 12/4035* (2013.01); *H04L 2012/40221* (2013.01)

(58) Field of Classification Search
CPC ............ G05B 19/4186; H04L 12/4035; H04L 12/40006; H04L 2012/40221; H04L 41/085; H04J 3/24
USPC ........................................................ 370/328
See application file for complete search history.

(56) References Cited

U.S. PATENT DOCUMENTS

| 7,969,985 B1* | 6/2011 | Cline et al. ..................... 370/394 |
| 7,969,995 B2* | 6/2011 | Collins ................... H04L 45/54 |
| | | 370/401 |
| 2004/0264383 A1* | 12/2004 | Rudolph ........... H04L 29/06027 |
| | | 370/252 |

(Continued)

FOREIGN PATENT DOCUMENTS

| DE | 10 2007 004 044 | 7/2008 |
| EP | 2 159 959 A1 | 3/2010 |

OTHER PUBLICATIONS

Robert Wilmes: "Dynamic Frame Packing (DFP) verleiht Profinet Flügel", Internet Citation, Apr. 29, 2009, pp. 1-6, XP002635338, gefunden im Internet: URL:http://www.elektroniknet.de/automation/technik-know-how/feldebene/article/1374/0/Dynamic_Frame_Packing_DFP_verleiht_Profinet_Fluegel/?type=9 [gefunden am May 3, 2011]; Others; 2009.

(Continued)

*Primary Examiner* — Asad Nawaz
*Assistant Examiner* — Kai Chang
(74) *Attorney, Agent, or Firm* — Cozen O'Connor

(57) ABSTRACT

A computer-implemented method for automatically generating dynamic frame packing groups for an automation system having a plurality of field devices. The field devices are assignable to different controllers, and the automation system is provided for communication between the field devices and the controllers using dynamic frame packing, where the method comprises receiving a description of the configurations of the field devices and the controllers, automatically generating the dynamic frame packing groups by analyzing the configurations, and assigning the field devices to packing groups.

10 Claims, 3 Drawing Sheets

(56) References Cited

U.S. PATENT DOCUMENTS

| | | | |
|---|---|---|---|
| 2005/0243757 A1* | 11/2005 | Yagyu | H04L 12/4625 370/328 |
| 2006/0002311 A1* | 1/2006 | Iwanaga | H04L 12/4675 370/254 |
| 2006/0062244 A1* | 3/2006 | Oksman | 370/465 |
| 2007/0226317 A1* | 9/2007 | Rydberg et al. | 709/218 |
| 2007/0280286 A1* | 12/2007 | Hodson et al. | 370/466 |
| 2008/0080521 A1* | 4/2008 | Sichner et al. | 370/400 |
| 2010/0074262 A1* | 3/2010 | Breit et al. | 370/400 |
| 2010/0115032 A1* | 5/2010 | Baird | H04L 12/2697 709/205 |
| 2010/0121951 A1* | 5/2010 | Trebing et al. | 709/224 |
| 2010/0211711 A1* | 8/2010 | Kuschke et al. | 710/110 |
| 2011/0072506 A1* | 3/2011 | Law et al. | 726/11 |
| 2012/0188912 A1* | 7/2012 | Chen | H04L 12/40032 370/258 |

OTHER PUBLICATIONS

Jasperneite J et al: "A Proporsal for a Generic Real-Time Ethernet System", IEEE Transactions on Industrial Informatics, IEEE Service Center, New York, NY, US, Bd. 5 No. 2, May 1, 2009, pp. 75-85, XP011255330, ISSN: 1551-3203; Others; 2009; US.

David Gunzinger et al: "Optimising Profinet IRT for fast cycle times: A proof of concept", Factory Communication Systems (WFCS), 2010 8th IEEE International Workshop on, IEEE, Piscataway, NJ, USA, May 18, 2010, pp. 35-42, XP031732754, ISBN: 978-1-4244-5460-0; Others; 2010; US.

\* cited by examiner

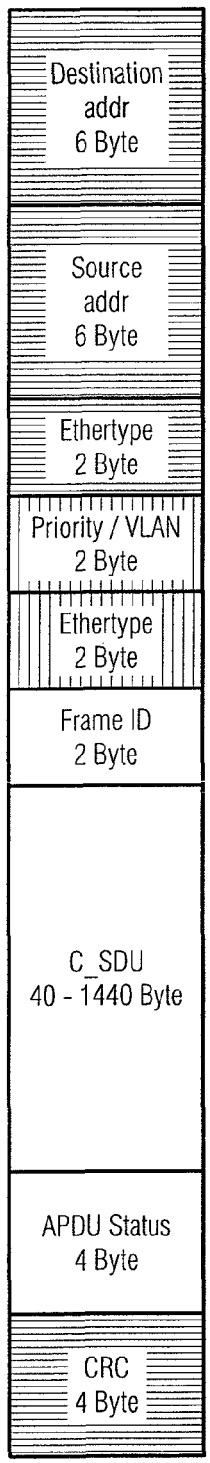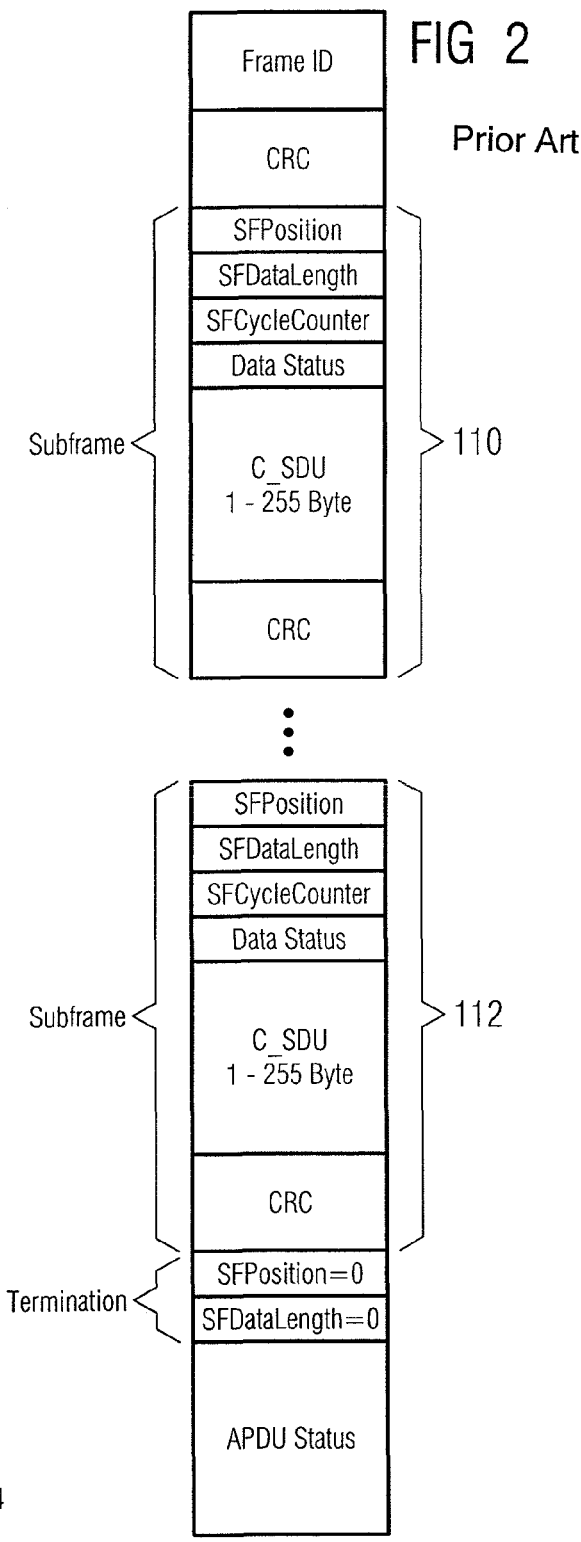

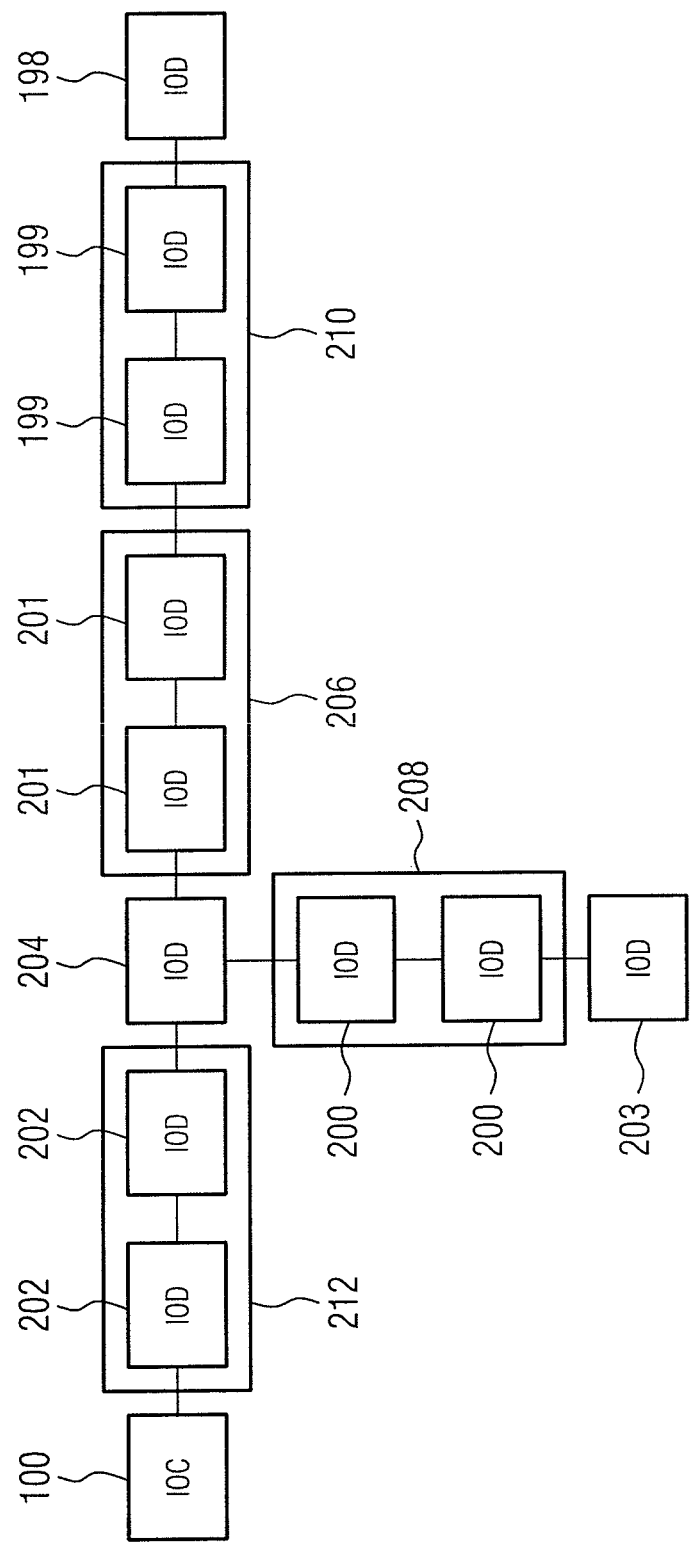

METHOD FOR AUTOMATICALLY GENERATING DYNAMIC FRAME PACKING GROUPS

BACKGROUND OF THE INVENTION

1. Field of the Invention

The invention relates to dynamic frame processing and, more particularly, to a computer-implemented method for automatically generating dynamic frame packing groups for an automation system, a device for automatically generating dynamic frame packing groups for an automation system and a computer program product.

2. Description of the Related Art

In order to increase the transmission rate of data from field devices to controllers in automation systems, the concept of dynamic frame packing (DFP) was introduced, whereby a data transmission is effected using container frames. Here, terminals that are assigned to a packing group transmit their data inside a container frame. The advantage of this is that the overhead for Ethernet frames that are used is borne only once for a given transmission, because of the container frame only a preamble, a start frame delimiter and a header are used, for example. This enables the packing density to be increased, so that within one clock cycle a data transmission by a plurality of field devices can occur, the transmission refreshment rates being significantly increased in comparison with a data transmission that does not use DFP.

FIG. 1 shows the structure of a typical realtime frame, this frame itself being encapsulated for Ethernet transmissions in accordance with Request for Comment (RFC) 894 using the elements destination address, source address, Ether type and Cyclic Redundancy Check (CRC). Where priority tagging is used in accordance with Institute of Electrical and Electronic Engineers (IEEE) Standard 802.1Q with the Ether type set to 0x8100, followed by a priority/VLAN field, followed by a second Ether type that is set to 0x8892 and that displays a realtime frame.

The frame ID is used to identify the frame itself, where C_SDU is designated for transporting the contents of the IO data and APDU status specifies the status of the frame.

The C_SDU can be structured so that it either carries the IO data of an individual field device or else it carries the IO data of several field devices. In the latter case, a part of the C_SDU (called the "subframe") carries the IO data of a particular field device, in which case the frame is subdivided into several subframes.

The reason for that is using a subdivision into frames is to minimize the bandwidth that is required and to consistently optimize the performance. As shown in FIG. 1, the overhead of a frame, i.e., the bytes to be transported besides the C_SDU, is 28 bytes. However, since the InterframeGap is an additional 12 bytes, the preamble is 7 bytes and the start frame delimiter is 1 byte and these must additionally be taken into account, the total overhead of a frame amounts to 48 bytes (or 42 bytes if the preamble is shortened to 1 byte). If the C_SDU is additionally smaller than 40 bytes, the difference must additionally be added.

Thus, it is apparent that using subdivided frames reduces the bandwidth required by combining subframes 110 and 112 because, as shown in FIG. 2, the overhead of a subframe is only 6 bytes. By combining several subframes in a single frame, the overhead for the frame that is used is thus only incurred once.

Each of the subframes 110 and 112 is assigned a position, a control bit, a data length that describes the length of the C_SDU, a cycle counter, a data status and a CRC. Here, the position is a unique identifier for a given subframe, where the list of subframes is concluded by a special subframe with the position number 0.

The control bit is used to specify whether the CRC and cycle counter of the subframe should be ignored.

The data status of a subframe specifies the data status of the subframe. The data status within the APDU status of the frame specifies the data status of the frame. If the frame consists of subframes, the data status of the frame can be ignored. Furthermore, it is helpful to assign the data status of the frame to a static value.

SUMMARY OF THE INVENTION

It is an object of the invention to provide a method for optimized and automatic generation of dynamic frame packing groups, and to provide a device for automatically generating the dynamic frame packing groups and a corresponding computer program product.

This and other objects and advantages are achieved in accordance with the invention by a computer-implemented method for automatically generating dynamic frame packing groups for an automation system having a plurality of field devices, where it is possible to allocate the field devices to different controllers, and the automation system is provided for communication between the field devices and the controllers using dynamic frame packing. The method comprises receiving a description of configurations of the field devices and the controllers, automatically generating the dynamic frame packing groups by analyzing the configurations and assigning the field devices to the packing groups.

The contemplated embodiments of the invention have the advantage that dynamic frame packing groups can be automatically generated in an optimized manner. Thus, instead of burdening a user with the formation of Dynamic Frame Packing (DFP) groups, a different approach is selected, which is performed with no extra configuration requirement and without any action on the part of the user.

In accordance with an embodiment of the invention, the assignment to packing groups is effected in a topological sequence, starting from the controller. This has the advantage that it is possible to automatically take into account all field devices and controllers without any errors. Thus, instead of randomly analyzing assignments of field devices to particular packing groups, the topological sequence of the field devices specified and laid down in the configuration description is used for the assignment to packing groups.

In accordance with another embodiment of the invention, the maximum number of field devices in a packing group is 63. This restriction enables a fully compatible use of the DFP protocol.

In yet another embodiment of the invention, if the maximum number of field devices in a packing group is reached, a new packing group is started.

In a further embodiment, a check is made for the field device topologically following a field device to determine whether the field device can be included in the same packing group as this topologically preceding field device. The DFP protocol is defined only for topologically consecutive field devices. A packing group thus should not be managed through a field device that is not part of the packing groups.

In a still further embodiment, if topological divergences are present below a field device, the assignment of the topologically following field devices is continued only down one branch of the topological divergences, where new packing groups are started for the field devices in a branch which is not continued, starting with the field device topologically closest to the divergence.

Here, as already stated above, the DFP protocol is defined only for topologically consecutive field devices. Moreover, the DFP protocol is defined only for a line structure. It should be understood that a packing group should not therefore contain any divergences.

In accordance with another embodiment of the invention, if a field device does not support communication using DFP, this field device is not included in a current packing group. Instead, a new packing group is started with the field device that topologically follows this field device that does not support DFP.

Here, as already stated above, the DFP protocol is defined only for topologically consecutive field devices. It should be understood that a packing group should not therefore be managed through a field device which is not part of the packing groups.

In yet another embodiment, if in respect of a current packing group a field device topologically following this packing group is assigned to a different controller than the field devices in the current packing group then the following field device is not included in the current packing group. Here, a new packing group is started with this following field device. The reason for this is that a packing group is always assigned to preferably precisely one IO controller. Thus, maximum compatibility for the use of the DFP protocol is also ensured.

In another embodiment, only field devices with identical refreshment and watchdog times are assigned to a common packing group. If in respect of a current packing group a field device topologically following this packing group has refreshment and watchdog times different from the field devices of the current packing group, a new packing group is started with this following field device. The reason for this is that a packing group should have a common refreshment and watchdog time. However, since from the user's perspective the refreshment and watchdog time is configured on the individual field device, only identically configured field devices are combined to form a packing group with the same attributes.

In another embodiment of the invention, if in respect of a current packing group a field device topologically following this packing group has a watchdog factor greater than 31, the following field device is not included in the current packing group. Here, a new packing group is started with a field device which immediately follows this following field device. The reason for this is that the factor for the watchdog time must not be higher than 31 in the case of a packing group (in contrast to the factor in the case of an individually configured field device) because of the DFP protocol. However, since from the user's perspective the refreshment and watchdog time is configured on the individual field device, a field device with an excessively high watchdog time should therefore not be a member of a packing group.

It is also an object of the invention to provide a computer program product with computer program code instructions, which can be executed by a processor, for performing the method in accordance with the above-described embodiments of the invention.

It is also an object of the invention to provide a computer system for automatically generating dynamic frame packing groups and for an automation system, where the automation system includes a plurality of field devices, and where it is possible for the field devices to be allocated to different controllers. Here, the automation system is provided for communication between the field devices and the controllers using dynamic frame packing, and the computer system is configured to perform receiving a description of the configuration of the field devices and of the controllers, and to automatically generate the dynamic frame packing groups by analyzing the configurations and assigning the field devices to these packing groups.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the following, preferred embodiments are explained in greater detail on the basis of the drawings:

FIG. 1 shows the structure of a conventional realtime frame;

FIG. 2 shows the structure of the subframes of the conventional realtime frame of FIG. 1;

FIG. 4 shows an exemplary formation of packing groups in accordance with the invention.

DETAILED DESCRIPTION OF THE PRESENTLY PREFERRED EMBODIMENTS

Figure 3:
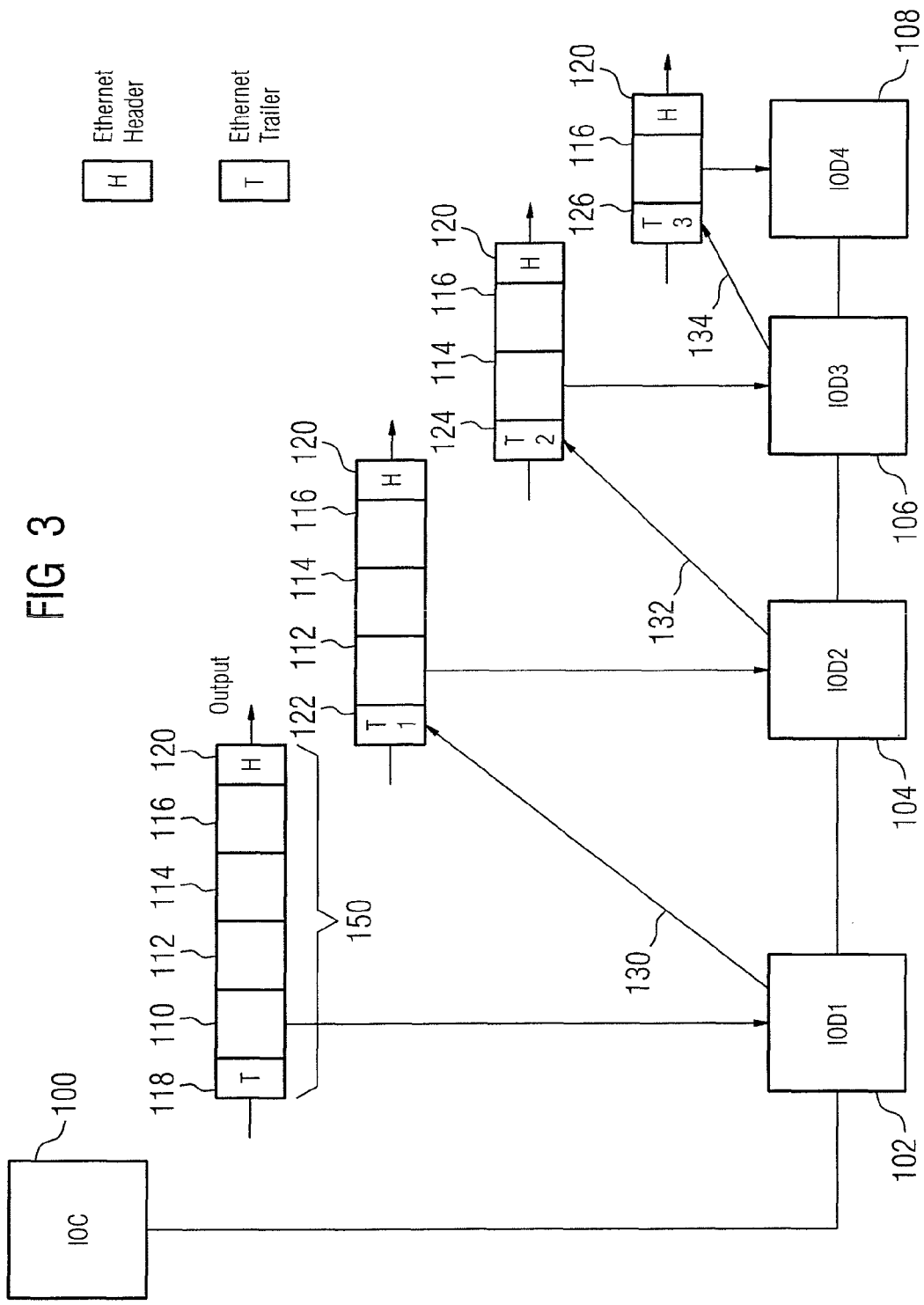
FIG. 3 shows the sequence of a method for data transmission using DFP in accordance with the invention.

In the following, elements similar to one another are characterized with the same reference characters.

FIG. 3 shows a method for data transmission using DFP. In the following example, it is assumed that in an automation system, besides a controller (IOC) 100, four field devices (IO devices) 102, 104, 106 and 108 are arranged topologically one behind another. Here, a data transmission using dynamic frame packing is effected from IOC 100 to the field devices so that the IOC 100 transfers a packet to the field device 102, this packet having several subframes 110, 112, 114 and 116 that each contain user data for the field devices 102, 104, 106 and 108. The container 150 used for the data transmission also has, besides the subframes 110, 112, 114 and 116, an Ethernet header 120 and an Ethernet trailer 118.

On reception of the container 150 by the field device 102, the field device 102 removes the sub-data frame 110 intended for it and then sends a new packet to the field device 104 in the step characterized by reference character 130. However, this new packet now no longer has the sub-data frame 110, but merely the sub-data frames 112, 114 and 116 which are intended for the topologically following field devices 104, 106 and 108. The Ethernet header 120 is taken over without change, whereas a new Ethernet trailer 122 is generated and appended to the data packet.

On reception of the data packet generated in this way by the field device 104, the field device 104 removes the sub-data frame 112 intended for it and in step 132 in turn generates a new packet, this still only having the sub-data frames 114 and 116, as well as the Ethernet header 120. Furthermore, the packet generated in this way also still has a new Ethernet trailer 124.

The packet generated in this way is then in turn received by field device 106, which removes the sub-data frame 114 and in step 134 transfers the remaining sub-data frame 116 together with the Ethernet header 120 and a new Ethernet trailer 126 to the last field device 108.

Thus, it can be said in summary that each IO device (each field device 102, 104, 106 and 108) is provided with frames in a consecutive sequence starting from the controller 100, where the field device forwards the packet in altered form to the downstream field device after each reception of the packet.

The problem with DFP is now to combine the field devices 102, 104, 106 and 108 appropriately into DFP groups, so that the requirements for realtime data transmission and thus a high data transmission performance can here be optimally taken into account, and so that the user is relieved of the task of optimizing the combination.

FIG. 4 shows different examples of how packing groups can be formed. With specific reference to FIG. 4, shows therein is a configuration of field devices and controllers in a network topology selected when the system was initially designed. Two field devices 202 are firstly connected topologically downstream to a controller 100, these two field devices being followed by another field device 204. Starting from this field device 204, a topological divergence is effected firstly in the direction of the field devices 200 and secondly in the direction of the field devices 201. The field devices 200 are topologically concluded by a field device 203, whereas the field devices 201 are topologically followed by another set of field devices 199. These field devices 199 are topologically concluded by another field device 198.

In order to enable the data transmission using DFP explained with respect to FIG. 3, the field devices shown in FIG. 4 must be suitably combined into packing groups. An automatic generation of the dynamic frame packing groups is effected by analyzing the topology shown in FIG. 4 as well as the exact configurations of the field devices shown and of the controller.

By way of example, the procedure can be as follows:

The assignment of the field devices to packing groups is effected in topological sequence starting from the controller. In the embodiment in FIG. 4, the two field devices 202 are combined into a packing group 212. The field device 204 cannot be integrated into this packing group 212, since the field device 204 has two network ports for two different network branches.

However, there also exists the elegant and preferred alternative of continuing the packing group through one port and starting a new packing group at the other port. Thus, the field device 204 can be included in the one packing group (if it does not violate other conditions), the packing group is continued through one port (e.g., in the direction of the devices 201) and a new packing group is started at the other port (in the direction of the devices 200).

In contrast, the field devices 200 can in turn be combined to form a packing group 208, since the number of field devices in this case does not exceed the FIG. 63. The fact that the field device 203 is not assigned to the packing group 200 may be due to various reasons. For example, the number of field devices in the packing group 208 is exactly 63, so that a new packing group must be started for the field device 203 because this maximum number of field devices is exceeded on integration with packing group 208. However, it is also possible that the field device 203 does not support communication using dynamic frame packing, so that this field device 203 also must not be included in the packing group 208. Finally it is also possible that the refreshment and watchdog times of the field device 203 differ from the refreshment and watchdog times of the field devices 200. As already explained above, a basic prerequisite for grouping field devices in a common packing group is that all field devices within this packing group have the same identical refreshment and watchdog times.

Finally, it is also still possible that the field device 203 was not included in the packing group 208 because the field device 203 has a watchdog factor greater than 31.

Since as already explained above, the field device 204 has two ports for two different network branches, in accordance with a particular embodiment of the invention a new packing group cannot start in the right-hand branch of FIG. 4 until the field devices 201. However, alternatively and as described above, the packing group is continued through a port and a new packing group is started at the other port.

The reason why the field devices 199 topologically following the field devices 201 were not included in the packing group 206, but a separate packing group 210 was formed for the field devices 199 is that, for example, the number of field devices in the packing group 206 would exceed the number 63, if additionally the field devices 199 were to be integrated into the packing group 206. Another reason could, for example, be the presence of other refreshment and watchdog times of the field devices within the group 210 compared to the field devices in the group 206.

The right-hand branch in FIG. 4 is concluded by a field device 198 which in turn is therefore not integrated into the packing group 210 because, for example, the field device 198 does not support communication using DFP.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A computer-implemented method for automatically generating dynamic frame packing groups for an automation system, the automation system having a plurality of topologically branched field devices, each of the plurality of topologically branched field devices being assignable to different controllers, the automation system being provided for communication between each of the plurality of topologically branched field devices and the different controllers using dynamic frame packing, the computer-implemented method comprising the steps:
receiving a description of configurations of the plurality of topologically branched field devices and the different controllers comprising an arrangement of the plurality of topologically branched field devices and the different controllers with respect to each other; and
automatically generating, by the computer, the dynamic frame packing groups by analyzing the configurations and assigning at least a portion of the plurality of topologically branched field devices to dynamic frame packing groups, the assigning of the plurality of topologically branched field devices to the dynamic frame packing groups being effected in topological order starting from the different controllers, a check being performed for each field device topologically following a topologically preceding field device of the plurality of topologically branched field devices to determine whether each field device is includable in a same dynamic frame packing group as the topologically preceding field device of the plurality of topologically branched field devices, wherein the assignment of topologically following field devices to a dynamic frame packing group of the topologically preceding field device is continued only along one branch of a topological divergence if the topological divergence is present at a field device of the plurality of topologically branched field devices.

2. The computer-implemented method as claimed in claim 1, wherein a maximum number of the plurality of topologically branched field devices in a dynamic frame packing group is 63.

3. The computer-implemented method as claimed in claim 2, wherein a new dynamic frame packing group is started if the maximum number of 63 is reached.

4. The computer-implemented method as claimed in claim 1, wherein a new dynamic frame packing group is started for each the field devices in branches which are not continued, starting with a field device located topologically closest to the topological divergence.

5. The computer-implemented method as claimed in claim 1, wherein the field device is not included in a current dynamic frame packing group if a field device of the plurality of topologically branched field devices does not support communication using dynamic frame packing, and a new packing group is instead started with the field device which topologically follows this field device.

6. The computer-implemented method as claimed in claim 1, where the following field device is not included in the current packing group if a current dynamic frame packing group of a field device topologically following this dynamic frame packing group is assigned to a different controller than the plurality of topologically branched field devices in the current dynamic frame packing group, a new dynamic frame packing group being started in this case with this following field device.

7. The computer-implemented method as claimed in claim 1, wherein only field devices of the plurality of topologically branched field device with identical refreshment and watchdog times are assigned to a common dynamic frame packing group, a new dynamic frame packing group being started with this following field device if a current dynamic frame packing group of a field device topologically following this dynamic frame packing group has different refreshment and watchdog times than the plurality of topologically branched field devices in the current dynamic frame packing group.

8. The computer-implemented method as claimed in claim 1, wherein the following field device is not included in a current dynamic frame packing group if a current dynamic frame packing group of a field device topologically following this packing group has a watchdog factor greater than 31, a new dynamic frame packing group being started in this case with a field device which follows this following field device.

9. A non-transitory computer program product encoded with a computer program executed by a computer that causes automatic generation of dynamic frame packing groups for an automation system, the non-transitory computer program product comprising:

program code instructions for receiving a description of configurations of a plurality of topologically branched field devices and controllers of the automation system comprising an arrangement of the plurality of topologically branched field devices and the different controllers with respect to each other; and program code instructions for automatically generating, by the computer, the dynamic frame packing groups by analyzing the configurations and assigning at least a portion of the plurality of topologically branched field devices to dynamic frame packing groups;

the assignment of the field devices to the dynamic frame packing groups being effected in topological order starting from the different controllers; a check being performed for each field device topologically following a topologically preceding field device of the plurality of topologically branched field devices to determine whether each field device is includable in a same dynamic frame packing group as the topologically preceding field device of the plurality of topologically branched field devices, wherein the assignment of topologically following field devices to a dynamic frame packing group of the topologically preceding field device is continued only along one branch of a topological divergence if the topological divergence is present at a field device of the plurality branched field devices.

10. A computer system for automatically generating dynamic frame packing groups, the computer system comprising:

an automation system having a plurality of topologically branched field devices, and at least one controller, each of the plurality of topologically branched field devices being assignable to different controllers, the automation system providing communication between each of the plurality of topologically branched field devices and the different controllers using dynamic frame packing;

wherein the computer system is configured to:
receive a description of configurations of the plurality of topologically branched field devices and the different controllers comprising an arrangement of the plurality of topologically branched field devices and the different controllers with respect to each other; and
automatically generate, by the computer, the dynamic frame packing groups by analyzing the configurations and assigning at least a portion of the plurality of topologically branched field devices to dynamic frame packing groups, the assignment of the plurality of topologically branched field devices to the dynamic frame packing groups being effected in topological order starting from the different controllers, a check being performed for each field device topologically following a topologically preceding field device of the plurality of topologically branched field devices to determine whether each field device is includable in a same dynamic frame packing group as the topologically preceding field device of the plurality of topologically branched field devices, wherein the assignment of topologically following field devices to a dynamic frame packing group of the topologically preceding field device is continued only along one branch of a topological divergence if the topological divergence is present at a field device of the plurality of topologically branched field devices.

* * * * *